US005597310A

United States Patent [19]
Edde

[11] Patent Number: 5,597,310
[45] Date of Patent: Jan. 28, 1997

[54] TEACHING MODEL OF THE BRONCHIAL AND LUNGS USEFUL FOR TEACHING THE BIOLOGY OF THOSE ORGANS

[76] Inventor: Pierre Edde, 2 Radio Ave., A-17, Secaucus, N.J. 07094

[21] Appl. No.: 441,486

[22] Filed: May 15, 1995

[51] Int. Cl.$^6$ .................................................. G09B 23/30
[52] U.S. Cl. .......................................... 434/272; 434/262
[58] Field of Search .................................... 434/262, 265, 434/267, 272

[56] References Cited

U.S. PATENT DOCUMENTS

| 2,288,296 | 6/1942 | Munro | 434/272 |
| 2,689,415 | 9/1954 | Haver | 434/272 |
| 4,167,070 | 9/1979 | Orden | 434/272 |
| 5,312,259 | 5/1994 | Flynn | 434/265 |

OTHER PUBLICATIONS

"Anatomical Products Catalog", 1991–1992 Edition, pp. 86, 87, 91, 100, 106, 126; pp. 148, 92, 107, 110, 143.

Primary Examiner—Paul J Hirsch
Attorney, Agent, or Firm—Sprung Horn Kramer & Woods

[57] ABSTRACT

A teaching model comprising an interassociated bronchial replica and a replica of the lungs of a creature; the bronchial replica being hollow-tube and being made up of a plurality of reversibly connectable sections, at least one section adjacent a lymph node of the creature being penetrable by the needle of a bronchoscope; the lung replica being essentially hollow and transparent, each lung comprising lobes reversibly connectable to one another. There is also employed a bronchoscope having a laterally advanceable needle, the needle being capable of penetrating said one section.

12 Claims, 8 Drawing Sheets

TEACHING MODEL OF THE BRONCHIAL AND LUNGS USEFUL FOR TEACHING THE BIOLOGY OF THOSE ORGANS

The invention relates to a model of the bronchial tree and lungs useful for teaching the biology of those organs.

The respiratory system comprises the lungs and the tracheobronchial tree. Each lung is divided into lobes and each lobe into segments. These lobes and segments are superimposed on and juxtaposed to each other in a manner to fit within the rib cage.

For teaching students about such systems, multiple-view pictures are available in textbooks. No matter how detailed they are, however, they do not provide a realistic three dimensional visualization of this complex anatomy.

Models have been constructed and are available on the market but none is sufficiently detailed and none shows how the airways can be conveniently inserted or removed from within the lungs in an anatomically correct position showing the direct relation and the extension of the bronchi in each particular lobe.

It is accordingly an object of the present invention to provide a practical lung model which can be completely separated along its various lobes giving a three dimensional understanding of the anatomy of the lungs and of the extension of the fissures, these being the natural planes that separate the various lobes.

It is a further object of the invention to provide a model of tracheobronchial tree, its construction, and of how it physically is joined to the lungs.

These and other objects and advantages are realized in accordance with the present invention pursuant to which there is provided a teaching model comprising the lungs and a hollow-tube replica of the bronchial tree of a person made up of plurality of reversibly connectable sections, at least those sections adjacent the lymph nodes of the creature being penetrable by the needle of a bronchoscope.

There is also provided a hollow replica of the lobes and of the lungs.

Advantageously the lobes are sub-divisible and connectable so that the bronchial model can be correctly positioned and the lung model then closed to form a composite model.

The lungs are essentially transparent giving access to viewing of the inside, enabling one to see the distribution and the branching of the airways.

To improve on the teaching capability of the invention, markings may be applied on the surface of the lungs identifying territories of the segments and subsegments of the lobes. The fissures may be opaque/colored giving a better appreciation of the compartmentalization of the lungs.

Each lung can be opened like a book allowing the positioning of the airways in an anatomically correct position.

The invention can be used to teach medical personnel the correct anatomy of the lungs and the way they are separated into lobes and segments. In addition, the relation and branching of the airways with respect to the lungs are clearly and easily demonstrated.

In accordance with yet another feature, to the top of the bronchial model there may be connected a section representing the passage from at least one of the nose and mouth to the bronchial tree.

For teaching, a bronchoscope provided with a laterally advanceable needle is inserted into the bronchial replica.

The individual sections of the bronchial tree may be connected to one another by friction fit, although screw, bayonet-slot, or other means of connection are also possible. Each section can be molded relatively inexpensively of readily available plastics, advantageously slightly stiff and translucent or transparent. It is even possible for the sections to be of bellows configuration.

The invention facilitates the teaching of the anatomy of the tracheobronchial tree and the lungs and the use of such anatomy to practice and master the manipulation of the bronchoscope for the diagnosis of tracheobronchial tree and lung diseases. The invention can also be used by physicians to explain more clearly to patients the location of disease, as well as to provide the patients with anatomically correct explanation of a specific procedure (e.g. bronchoscopy, tracheobronchial needle aspiration/biopsy of lymph node, segmentectomy, lobectomy, pneumonectomy, etc. . .).

The backs of the nose and mouth both enter the trachea, a vertical passageway almost one inch in diameter and several inches long. The trachea forks as in a Y into two bronchial passages of somewhat reduced diameter which are connected to and enter into the lungs. Each lung is made up of two (left) or three (right) lobes or compartments. Within its particular lobe a bronchus is further forked into other multiple sub-passageways.

In addition, adjacent but outside the trachea, and connected to and within the lungs adjacent the bronchial tree, are lymph nodes, all located at predetermined anatomical locations relative to the bronchi. The lymph nodes serve to filter out infection and trap cancers.

If a patient has a breathing problem or some other problem which might be attributable to a bronchial tree or lymph node problem, there is an instrument which the physician uses for diagnostic purposes. It includes features like a submarine periscope but is much more complex and requires the manual dexterity of a puppeteer. This is called a bronchoscope, a well known instrument.

The bronchoscope is handhold and has a body which encloses mechanisms and electronic circuitry and which carries on its outside various manipulable controls.

Projecting from the body of the bronchoscope is a tube of about 3/16 inch diameter, rubber-covered. The tube is relatively stiff but can be bent without great resistance. This tube is long enough to reach those sections of the bronchial tree adjacent the lymph nodes of the creature, the tubes being penetrable by the needle of a bronchoscope.

Inside the tube are optical fibers which can bend with the tube and serve to bring light to the forward or downstream end. The forward end of the tube is inserted into the patients' nose or mouth and the tube is advanced. The controls of the bronchoscope body are manipulated by the physician to advance the tube through the windpipe and whichever downstream bronchial passageway is desired, while observing what the lit forward end passes. Means are provided to scan, i.e. to look in a full circle 360° at any position of the tube, just as in a periscope.

The bronchoscope is a well known viewer, like a periscope. It is held by hand. In a working-channel of the bronchoscope a special needle can be inserted from the body to the distal end of the tube. This special needle ("Wang" needle) can be extended or retracted like the tongue of a snake, the extension being at most about ½ inch. The needle itself is hollow so that, if inserted into a suitable mass such as a lymph node or a cancerous body, some of such mass will enter the hollow of the needle. The controls outside the body of the bronchoscope serve to extend the needle so it can penetrate the bronchial wall and enter the lymph node to withdraw a sample. The needle is then withdrawn from the working-channel, its sample removed and analyzed.

In any given run, the physician might look only at the bronchial tree and not need a lymph node specimen. That is of course for him or her to decide.

Independent thereof, where just inspecting or sampling, one might wonder how the physician knows "geographically" where he or she is within the bronchial tree. The hand-held instrument of course knows the length of tube it has fed out but that is not enough information.

Nature provides the answer. The inside of the windpipe has rings, similar to accordion pleats, or a stack of washers. The physician can visually identify a condition as existing between rings 7 and 8, for example. Within the bronchial tree there are no similar rings, but like a highway map, he or she can tell that the condition is halfway between the second and third forks, for example.

The physician wants this geographic information for several reasons, particularly for possible surgery. One of the patient's lymph nodes is positioned outside the windpipe at approximately the seventh ring. Another is positioned within a lung outside but adjacent the bronchus halfway between the second and third forks. Thus the physician would know exactly where to extend the needle to hit a lymph node and take a sample, necessary for diagnosis and possible surgery.

As stated, control of the body of the bronchoscope requires a great deal of manual dexterity to advance the tube, bend it as needed in order to position the downstream end of the tube where desired, since bodies come in various sizes, small, medium and large. And then there are children. And even within medium, for example, there are differences. One could practice with bronchial tree possibly taken from a cadaver. Aside from the cost and problems associated therewith, natural bronchial tree will decompose. If you treat one chemically to effect reaction of the amino acids making it up, the bronchial tree will be hardened and perhaps no longer be penetrable by the needle.

One could simply take one natural bronchial assembly, make a model from it and then make moldings. Because of the complexity of the bronchial system this would be impractical.

The windpipe and bronchial tubes of the invention may be formed at multiple lengths of the same or difference plastics, some or even all of the them being transparent. By joining multiple small moldings, overall molding is far simpler and less expensive than one comprehensive complicated molding. Further, by having to assemble the multiple moldings the student also learns the anatomy.

The individual components making up the bronchial model can be few or many in number. By being many in number, each component can be an inexpensive element from standard-diameter plastic tubing or can be molded in progressively decreasing diameter to simulate the normal anatomy. They can easily be joined longitudinally and for branching, either a tee is provided or an aperture is made into which a tubular branch is friction-fit, threaded, corrugation-fit, or otherwise joined.

The tubes in whole or in part may be formed of soft or foamed rubber or plastic so as to be penetrable The invention will be further described with reference to the accompanying drawings, wherein:

Figures 1, 3:
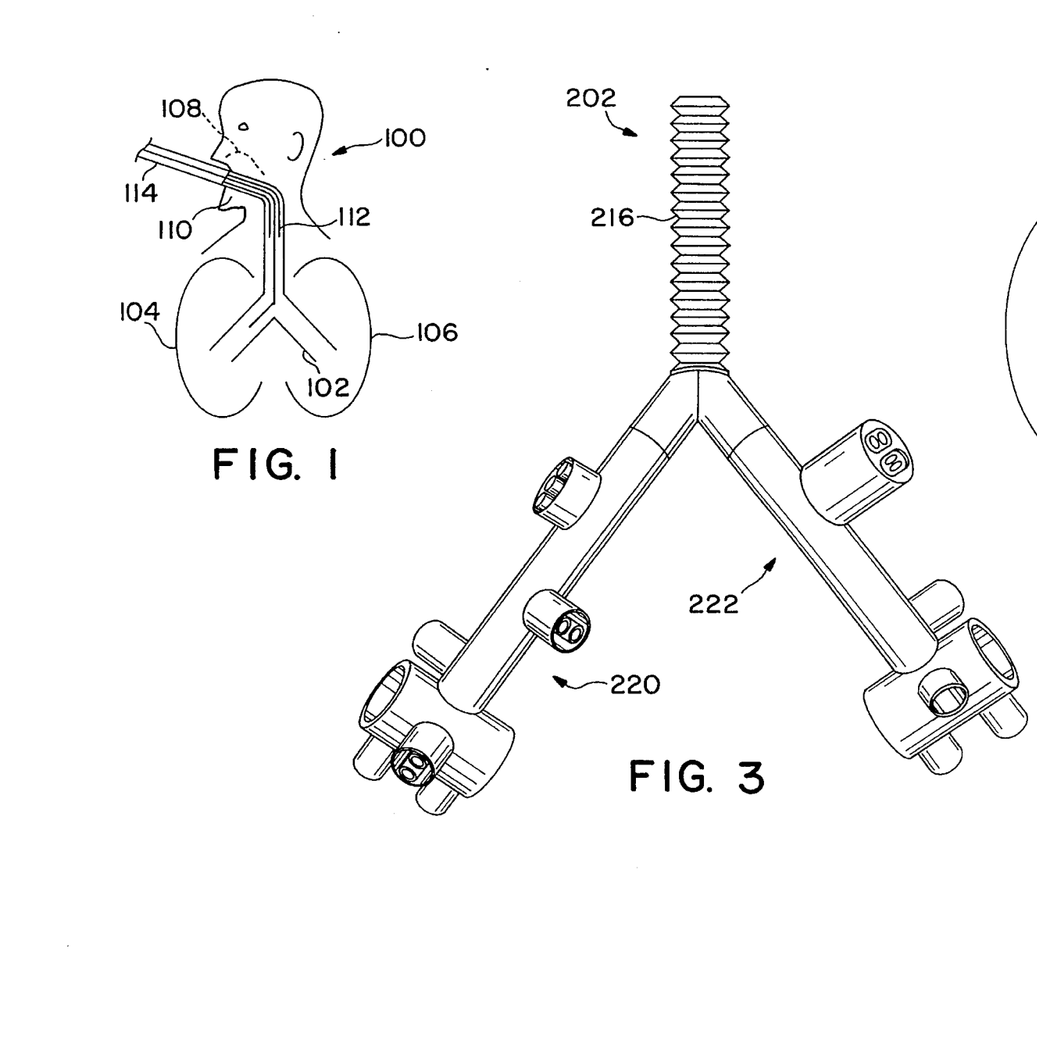
FIG. 1 is a schematic sectional view showing a patient's lungs and bronchial system and how a bronchoscope is positioned therein for inspection and penetration.
FIG. 3 is a frontal perspective view of a bronchial tube assembly in accordance with the invention.

Referring now more particularly to the drawings, in FIG. 1 there is shown a patient 100 having a bronchial system 102 extending into his lungs 104, 106. At its upper end, the bronchial system connects with the nasal passage 108 or the buccal passage (mouth) 110.

An endotracheal tube 112 is shown inserted into the patient's mouth and through that the tube 114 of a bronchoscope extends into the bronchial tree of the patient. The tube 114 at its forward end in conventional manner has a light and a needle and means for manipulating the light and needle (all not shown), so as to see and/or penetrate the patient's bronchial wall wherever desired.

Figure 2:
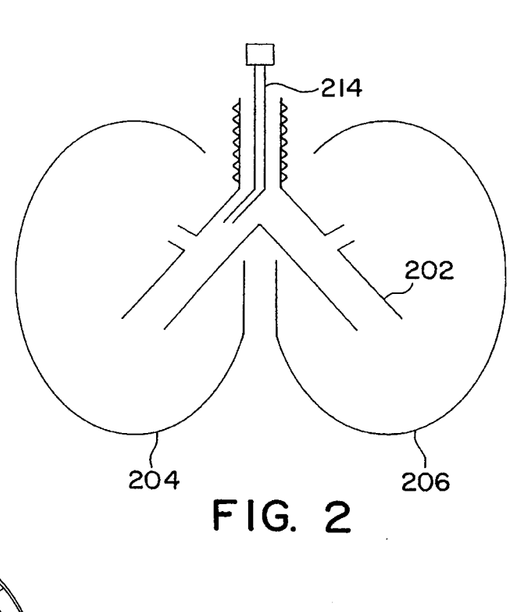
FIG. 2 is schematic sectional view of the composite model plus bronchoscope in accordance with the invention, parallelling FIG. 1.

The model of the invention in FIG. 2 parallels the live section shown in FIG. 1. It comprises model bronchial system 202, model lungs 204, 206 and tube 214 of a bronchoscope. It may include a tube corresponding to 112.

As seen in FIG. 3, the model 202 comprises a trachea 216, advantageously formed of corrugated tubing so as to provide rings 218 simulating tracheal rings in a human.

Figure 4:
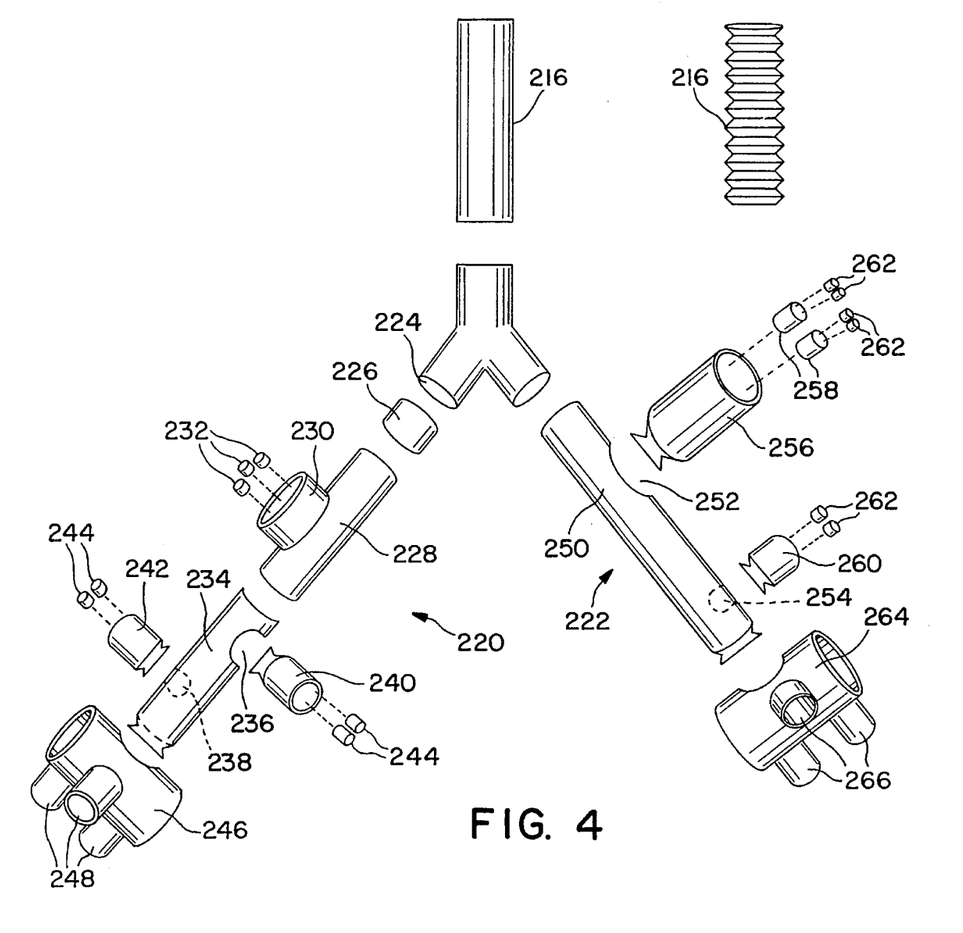
FIG. 4 is an exploded view similar to FIG. 3.

Turning now to FIG. 4 in right branch 220 a short piece (226) connects the distal tip of the right branch of the inverted Y-piece 224 to the proximal end of a T-piece 228 to form the segment simulating the right main bronchus 220.

The perpendicular portion 230 of the T-piece 228 forms the right upper lobe bronchus.

Figures 5, 6:
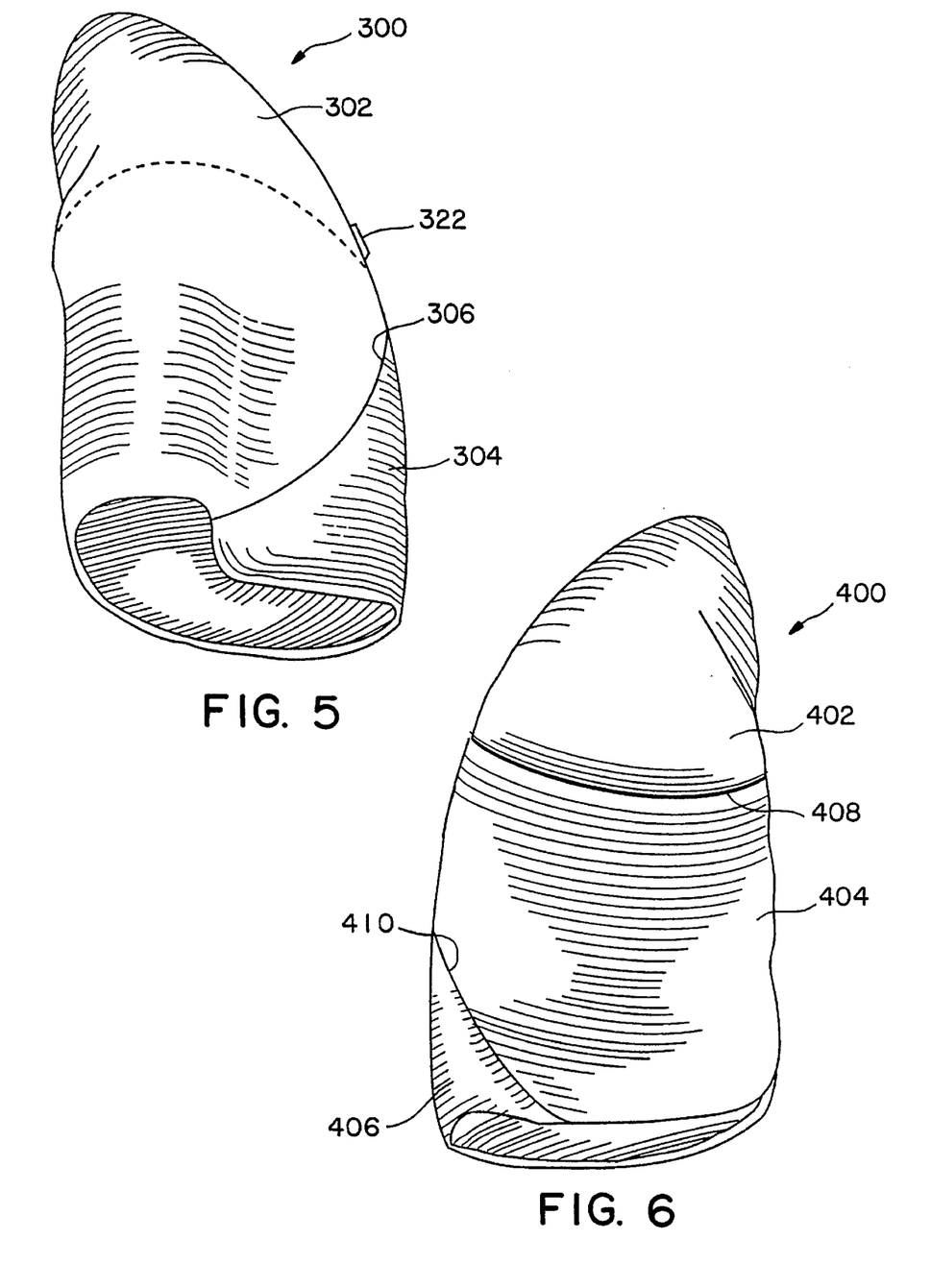
FIG. 5 is a frontal view of the left lung model assembled.
FIG. 6 is a frontal view of the right lung model assembled.

Into this perpendicular portion 230 fit three smaller tubes 232 each representing an opening to a segment of the right upper lobe of the lungs (FIGS. 5 and 6).

Beyond the right upper lobe branch, the right main stem breach continues downward as bronchus intermedius, viz. tube 234 fitting into the distal end of the T-piece 228.

This tube 234 has two side openings:

236 represents the orifice of right middle lobe bronchus

238 represents the opening of the bronchus to the superior segment of the right lower lobe.

In each of these orifices, a smaller caliber tube having a corrugated end (made, for example, from Pediatric Ventilator tubing) is force-fit to simulate the right middle lobe bronchus and the bronchus to the superior segment of the right lower lobe.

In each of these smaller caliber tubings 240, 242 even smaller caliber tubings 244 are fitted, simulating subdivisions in the bronchial tree. The distal end of the plastic tube 234 fits perpendicularly into another tube 246 of the same caliber. This tube 246 along with three other caliber tubes 248 fitted on it represent further subdivisions of the right lower lobe bronchus.

The tip of the left branch of the inverted Y-piece 224 is connected to a tube 250 to simulate the left main bronchus 222.

This tube 250 has two side openings:

252 more proximal and larger represents the orifice of the bronchus of left upper lobe.

254, more distal and smaller represents the orifice of the bronchus to the superior segment of the left lower lobe.

In the first orifice 252, a same caliber tube 256 is fitted, simulating the left upper lobe bronchus.

Within this tube 256, two smaller caliber tubes 258, 260 (for example, made of Pediatric Ventilator Tubes) are inserted representing bronchi to subdivisions in the left upper lobe called the upper division bronchus and the bronchus to the lingula.

Within smaller caliber 258, and directly into 260 even smaller caliber tubes 262 are inserted, representing further subdivision.

The distal end of the plastic tube 250 fits perpendicularly into another tube 264 of the same caliber. This tube 264 along with three other smaller caliber tubes 266 fitted on it, represent further subdivisions of the left lower lobe bronchus.

The second component of the model is the lungs.

The right and left lungs are made of transparent plastic.

FIG. 5 is an anterior view of the left long 300 showing the left upper lobe 302 and the left lower lobe 304 separated by the fissure 306.

FIG. 6 is an anterior view of the right lung 400 showing its three lobes, viz. the right upper lobe 402, the right middle lobe 404 and right lower lobe 406, as well as minor fissure 408 and major fissure 410.

Figure 7:
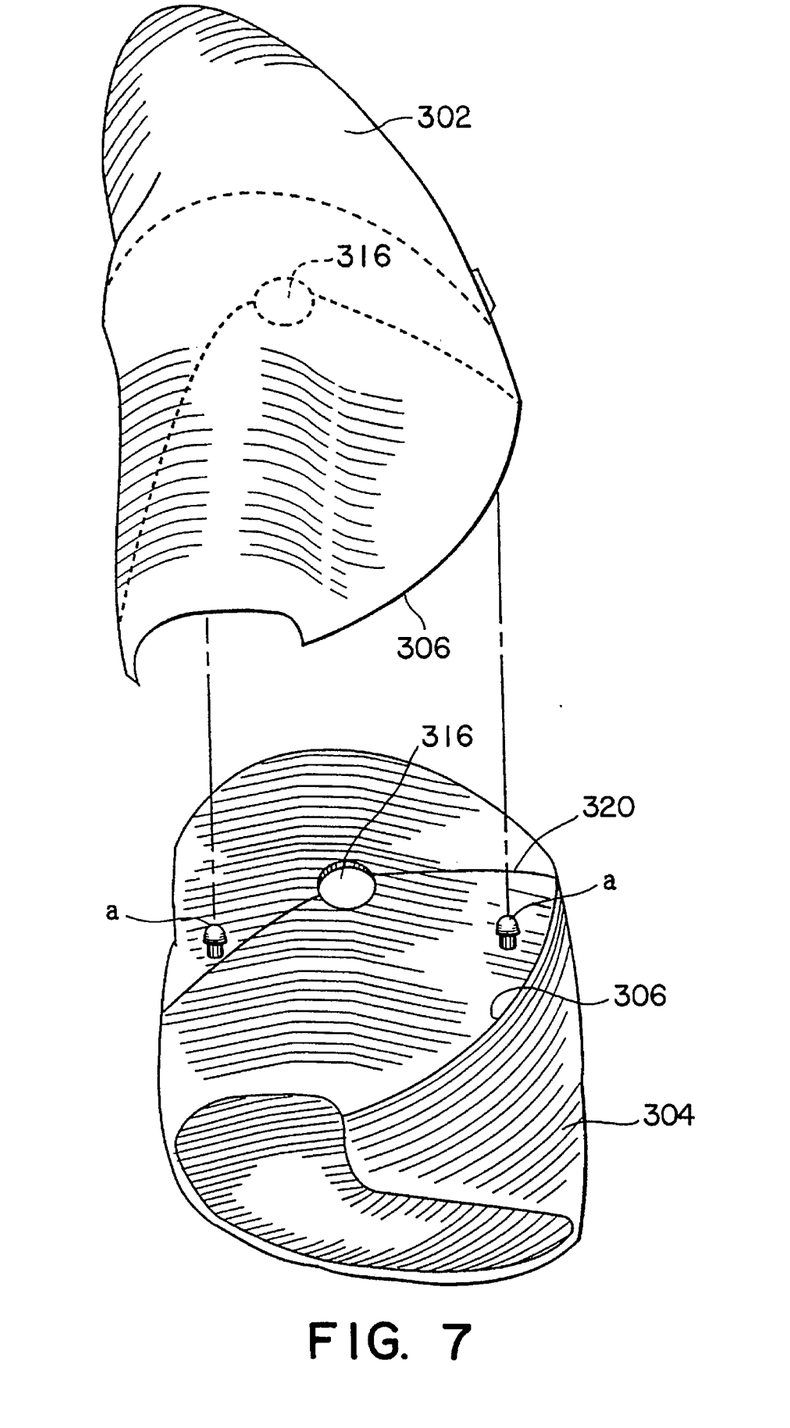
FIG. 7 is an exploded view of the left lung separated along its fissure (i.e., divided in 2 lobes)

FIG. 7 is an exploded view of the left lung 300 of FIG. 5 showing the left upper lobe 302 and the left lower lobe 304 completely and totally separate from each other along the anatomical fissure 306.

Figure 8:
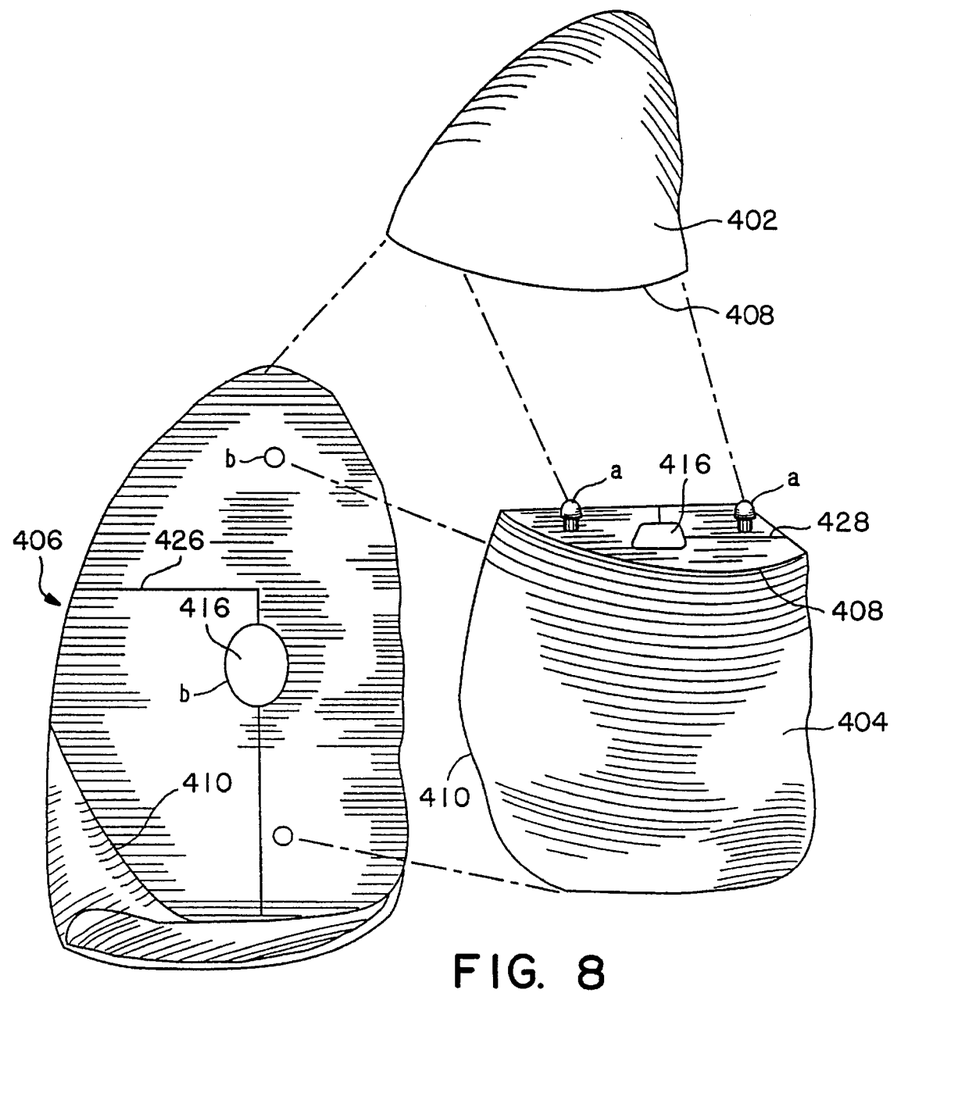
FIG. 8 is an exploded view of the right lung separated along its fissures (i.e., divided into three lobes)

FIG. 8 is an exploded view of the right lung 400 showing the right upper lobe 402, the right middle lobe 404 and the right lower lobe 406 completely and totally separated from each other along the anatomical fissures.

In FIGS. 7 and 8 there are shown "male to female junctions" (designated respectively as a and b) used to hold the matching lobes together during reconstruction of the lungs.

Releasable joinders other than male-female may be similarly utilized, e.g. separable joinder of the Velcro type, adhesives, separable adhesives of the type used in stick-ems, and the like.

FIGS. 7 and 8 also show the openings (designated) through which the bronchial tree can be positioned in the model.

Figure 9:
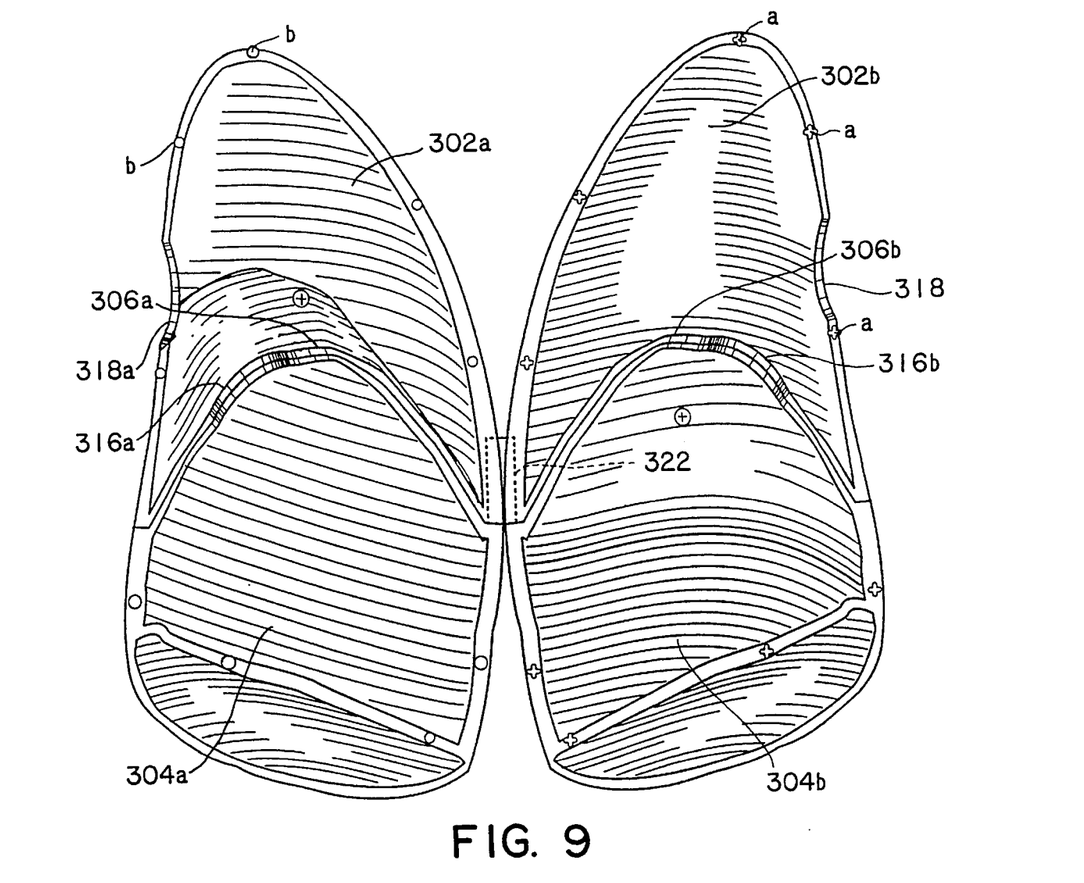
FIG. 9 is a front view of the left lung model of FIG. 4 showing it swung open into two halves for assembly, not anatomically so.
Figure 10:
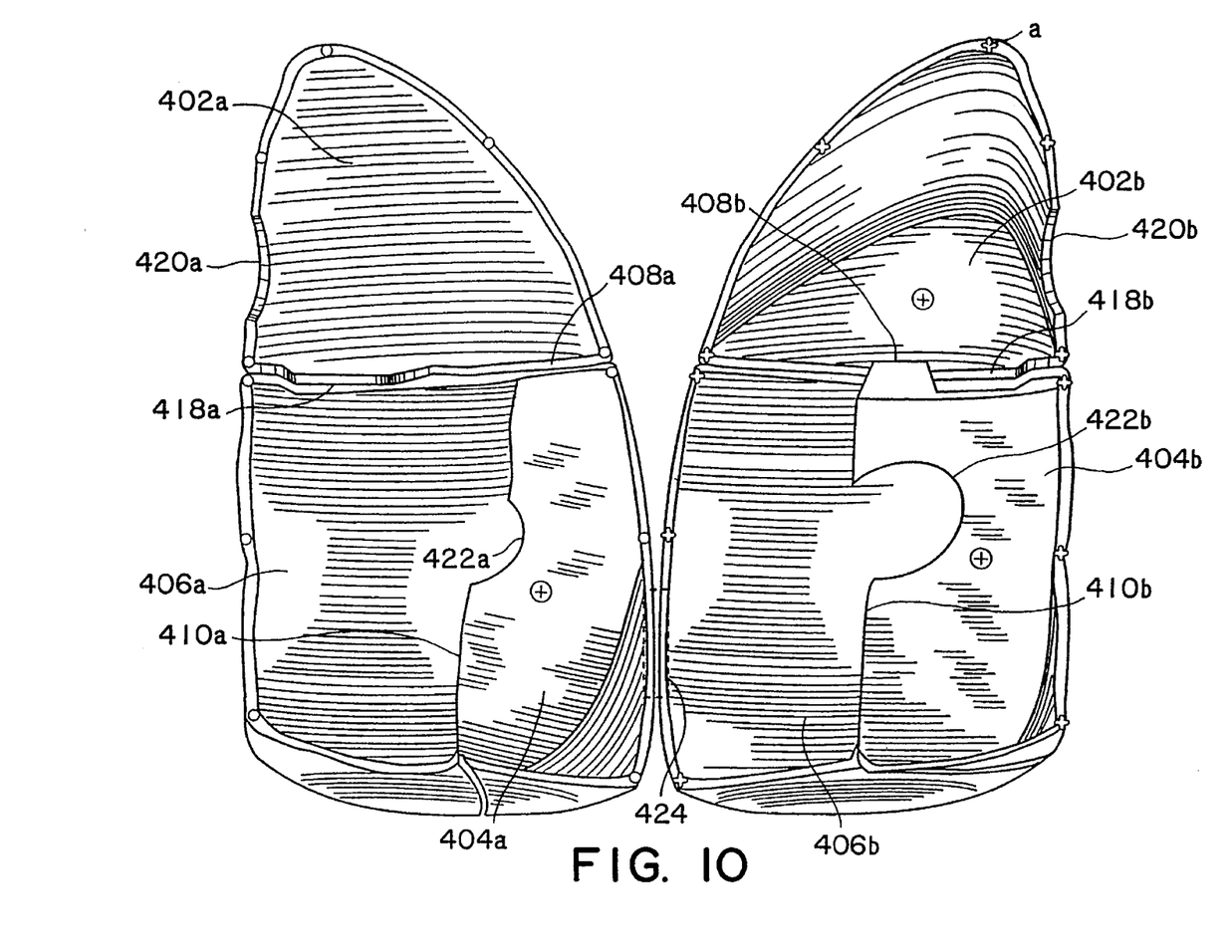
FIG. 10 is a frontal perspective view of the right lung model showing it swung open into two halves, also not anatomically correct.

Each lung can be opened like a book into two halves. FIGS. 9 and 10 show the left and right lungs respectively in their open positions. Additional "male-female junctions" (designated as a and b) are shown which hold the complementary parts of each lung together, once closed.

In FIG. 9 the left lung is shown in the open position. The left upper lobe is shown split open into two halves 302 a and b. The left lower lobe is also split in two parts 304a and 304b. The fissure is also split in two parts 306a and 306b. The openings 316, 318 through which the trachealbronchial tree pass (316 in FIG. 7) and both 316 and 318 in FIG. 9) are also split in two parts each.

The plane through which the left lung is split open is difficult to visualize in FIG. 6 but is better seen in FIG. 7. The anterior and posterior split parts of the left lung are held together by the hinge 322.

In FIG. 10, the right lung 400 is shown in the open position. The right upper lobe 402 is shown split open in two parts 402a and 402b. The right middle lobe 404 is also split in two parts 404a and 404b. The right lower lobe 406 is also split in two parts 406a and 406b. The openings 416, 418 through which the Tracheobronchial tree pass (some of which are shown in FIG. 8) are also split in two parts each (420a and 420b and 422a and 422b, not visible in FIG. 8.

The minor fissure 408 is also split in two parts, 408a and 408b.

The major fissure 410 is also split in two parts, 410a and 410b.

The anterior and the posterior split parts of the right lung are held together by a hinge 424.

The flat plane 426 and the angulated plane 428 through which the right lung is split open are not visible in FIG. 10 but are seen in FIG. 8.

Figure 11:
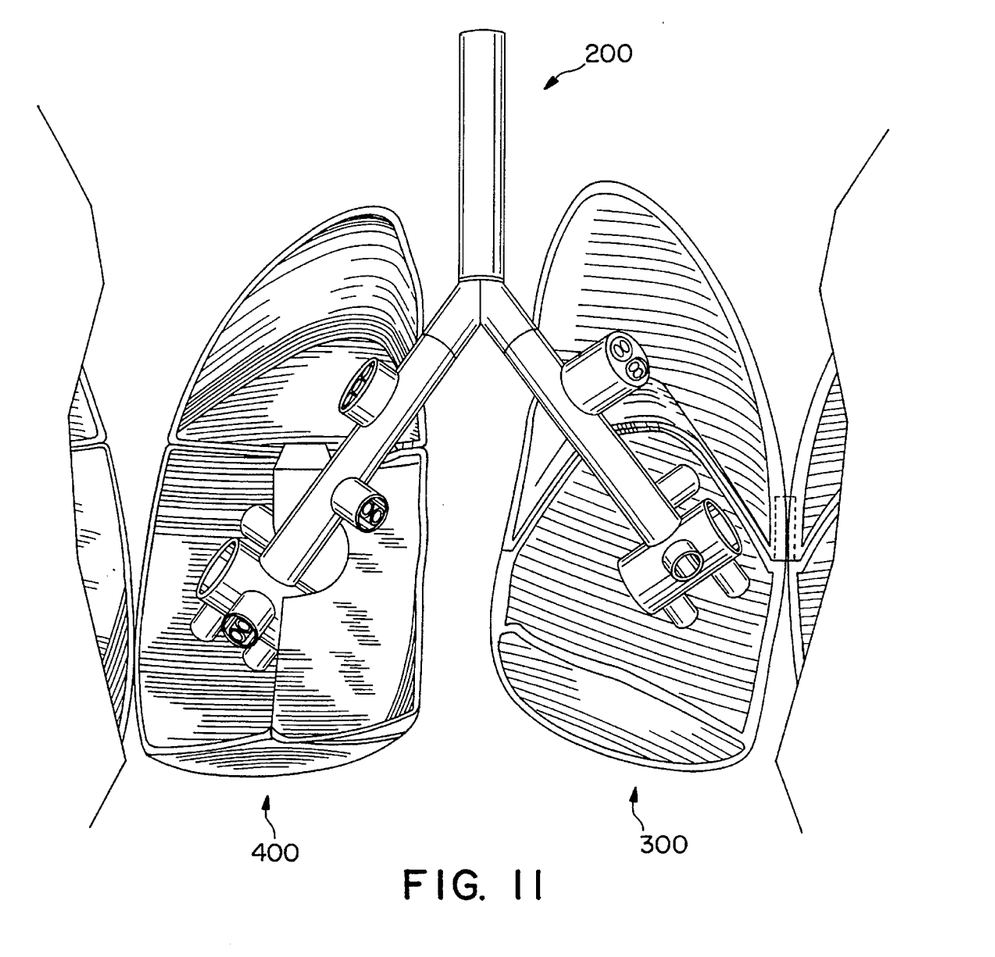
FIG. 11 is a view of both lungs open with the tracheo-bronchial tree correct positioned.

In FIG. 11 the right 400 and left 300 lungs are open with the tracheobronchial tree 200 placed in its anatomical position.

Use of the model is as follows, starting with the unassembled tracheobronchial components of FIG. 4 and the unassembled lung components of FIGS. 5 and 6:

The tracheobronchial components of FIG. 4 are assembled as shown, producing the model of FIG. 3.

The lung components are partially assembled, leaving open the semi-circle to receive the tracheobronchial model which is then laid into the opened lungs so that branch 220 lays on open semi-circle and branch 222 on the other open semi-circle. The halves of each lung are brought together and secured to one another, thus fixing the tracheobronchial model in position within the lungs, as shown in FIG. 2.

While not shown since they are not part of the model, lymph nodes are present in several locations within the lungs, for example outside branch 220 halfway between the junction of the branches in 224 and side branch 230. Thus the student has a good idea where the lymph nodes are, even though he or she cannot see the node.

Let us assume the student wishes to examine the trachea of a patient and to take a lymph node sample.

The operator inserts the tube of the bronchoscope into element 216, corresponding to the patient's windpipe. Light is turned on so the operator can see the inside of the patient's trachea. By manipulation of the manual controls, the tube 112 is caused to move down branch 220, for example, and the operator sees the condition and geometry of the branch. In a live patient he might see roughness, various degrees of closure, growths, etc.

In the model, the operator learns which manipulations of the bronchoscope cause its forward end to move downstream in a straight line or to move about a 360° arc opposite one of the branches to bend and/or to advance through such branch.

When the operator believes the forward end of the tube is just opposite a lymph node with the patient's lung to take a sample of the lymph node, he rotates the tube and bends the tube front so it points at the wall of the bronchus aligned with the lymph node, he actuates a needle-sampler in the bronchoscope tube so it penetrates the bronchus wall, enters the lymph node and takes a sample.

Then he reverses the penetration to withdraw the tube from the node, the bronchus wall, the bronchus and the trachea so he has a sample free from the body. He discharges the sample from the bronchoscope tube and then examines it visually and/or prepares it for testing.

The teacher and the student himself can see through the transparent lung model and see where the bronchoscope needle penetrated the trachea, i.e. see if the penetration was in the proper location. If not, more practice.

Possibly only certain lengths of the individual trachea bronchus are needle-penetrable, for ease of manufacture. If the student actuates the needle in a non-penetrable area he will know he was totally wide of the mark.

With the instant model lymph node models are not necessarily provided but the operator can still use the needle to practice proper penetration through the bronchus wall, at least that portion of the bronchus, adjacent the lymph node, being penetrable by the needle. If desired, however, test lymph node samples or models, can be positioned within the lungs.

The model can also be used for testing a student's facility with the bronchoscope and/or diagnostic ability. Thus one or more sections of tubing may be marked internally with a legend or "pictures" corresponding to a bronchial problem and the student is asked to identify if, what and where that might be. Thus the invention extends as well to a method of testing a student.

It will be understood that the specification and examples are illustrative but not limitative of the present invention and that other embodiments within the spirit and scope of the invention will suggest themselves to those skilled in the art.

What is claimed is:

1. A teaching model comprising a hollow-tube replica of the bronchia of a creature made up of a multiplicity of hollow tube members of a plurality of different diameters, the members having means for reversibly connecting them to and disconnecting them from one another, the diameters of the assembled members of the replica generally decreasing from the top to the bottom of the replica.

2. A teaching model according to claim 1, wherein at least one of the members at a location adjacent where a lymph node of the creature would be present is formed of a material which is easily penetrated by the needle of a bronchoscope.

3. A teaching model according to claim 1, wherein the connections between at least some of the members are force fits, one having an opening and its mate having a projection extending into it.

4. A teaching model according to claim 1, wherein at least some of the members are formed of corrgulated plastic.

5. A teaching model according to claim 1, wherein at least some of the members are sufficiently transparent to see a bronchoscope tube if present within the members.

6. A teaching model according to claim 1, further including a hollow tube member including means for reversibly connecting it to and disconnecting it from the top of the bronchia, corresponding approximately in size and angulation to the creature's channel from nose, mouth or both to its bronchia.

7. A teaching model comprising an interassociated bronchial replica and a replica of the lungs of a creature, one lung comprising three lobes and the other lung comprising two lobes, the lobal replicas including openings corresponding to the openings wherein a patient's bronchia enter into his lungs, the bronchial replica being made up of a multiplicity of hollow tube members of a plurality of different diameters, the members having means for reversibly connecting them to and disconnecting them from one another, the diameters of the assembled members of the replica generally decreasing from the top to the bottom of the replica, the bronchia extending through said lobar openings so as to secure said replicas when the lungs are in normal positions.

8. A teaching model according to claim 7, further including means connecting two of the lobes of at least one lung so that the lobes may be pivoted relative to one another to expose the space between the lobes.

9. A teaching model according to claim 7, wherein at least one of the members of the bronchial replicas at a location adjacent where a lymph node of the creature would be present is formed of a material which is easily penetrated by the needle of a bronchoscope.

10. A teaching model according to claim 9, further including a hollow tube member including means for reversibly connecting it to and disconnecting it from the top of the bronchia, corresponding approximately in size and angulation to the creature's channel from nose, mouth or both to its bronchia.

11. In combination, a teaching model according to claim 10 and a bronchoscope, the bronchoscope having a laterally advanceable needle capable of penetrating said one member.

12. A method for a teacher to test a student's ability properly to use a bronchoscope having an advanceable and retractable tube, a light for illuminating the forward end of said tube, means for bending the forward end of said tube so as to illuminate and scan the bronchial tree of a patient, and a needle which can be advanced from the retracted into the forward end of said tube, which comprises the steps of a) the student advancing the tube of said bronchoscope through a tracheobronchial model according to claim 11, b) the student performing a procedure or makes a determination at some specified point within the tracheobronchial model, and c) the teacher assessing the accuracy of the student's act or determination.

* * * * *

UNITED STATES PATENT AND TRADEMARK OFFICE
CERTIFICATE OF CORRECTION

PATENT NO. : 5,597,310
DATED : January 28, 1997
INVENTOR(S) : Edde, Pierre

It is certified that error appears in the above-indentified patent and that said Letters Patent is hereby corrected as shown below:

Title Page & Col. 1 line 1     After " BRONCHIAL " insert -- TREE --

Signed and Sealed this

Seventeenth Day of June, 1997

Attest: *Bruce Lehman*

BRUCE LEHMAN

*Attesting Officer*     *Commissioner of Patents and Trademarks*